US007365799B2

(12) United States Patent
Kawahara

(10) Patent No.: US 7,365,799 B2
(45) Date of Patent: Apr. 29, 2008

(54) GRADATION DISPLAY DEVICE

(75) Inventor: Isao Kawahara, Toyono (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 574 days.

(21) Appl. No.: 10/533,133

(22) PCT Filed: Apr. 27, 2004

(86) PCT No.: PCT/JP2004/006073

§ 371 (c)(1),
(2), (4) Date: Apr. 29, 2005

(87) PCT Pub. No.: WO2004/097777

PCT Pub. Date: Nov. 11, 2004

(65) Prior Publication Data

US 2006/0055827 A1 Mar. 16, 2006

(30) Foreign Application Priority Data

Apr. 28, 2003 (JP) ............................ 2003-124108
Apr. 28, 2003 (JP) ............................ 2003-124109

(51) Int. Cl.
*H04N 5/00* (2006.01)
*H04N 5/66* (2006.01)
*G09G 3/28* (2006.01)
*G09G 5/10* (2006.01)

(52) U.S. Cl. ........................ 348/607; 345/690; 345/60; 345/63; 348/797

(58) Field of Classification Search ................ 348/797, 348/699, 700, 671, 618–622, 625, 607; 345/60, 345/63, 690, 691, 596, 589, 598, 692, 693, 345/694
See application file for complete search history.

(56) References Cited

U.S. PATENT DOCUMENTS 6,091,396 A * 7/2000 Minami et al. ............. 345/690
6,661,470 B1 * 12/2003 Kawakami et al. ......... 348/699
6,924,778 B2 * 8/2005 Awamoto et al. ............. 345/60

FOREIGN PATENT DOCUMENTS

| | | |
|---|---|---|
| EP | 1 387 340 | 2/2004 |
| JP | 5-30495 | 2/1993 |
| JP | 11-212517 | 8/1999 |
| JP | 11-231832 | 8/1999 |
| JP | 2000-163004 | 6/2000 |
| JP | 2001-42819 | 2/2001 |
| JP | 2001-83926 | 3/2001 |

* cited by examiner

*Primary Examiner*—M. Lee
(74) *Attorney, Agent, or Firm*—Wenderoth, Lind & Ponack, L.L.P.

(57) ABSTRACT

The gradation display device contains gradient detecting circuit (3) for detecting a gradient of gradation values of pixels in an incoming image; time-varying gradation-value detecting circuit (4) for detecting changes in gradation values of the pixels with a passage of time; an image detector for detecting a magnitude and a direction of movement of the incoming image according to outputs from gradient detecting circuit (3) and time-varying gradation-value detecting circuit (4); and gradation correcting circuit (12) for correcting signals of the incoming image according to the detected magnitude and direction of the image and the weight of luminance assigned to each of the sub-fields so as to display proper image.

7 Claims, 18 Drawing Sheets

FIG. 2

| Smoothness (S) | × | × | × | × | S≥TH1 | S<TH1 |
|---|---|---|---|---|---|---|
| Gradient (G) | × | × | G<TH2 | G>TH3 | TH2≤G ≤TH3 | × |
| Time-varying gradation values (B) | B<TH4 | B>TH5 | × | × | TH4≤B ≤TH5 | × |
| Characteristics of areas | no change with time | drastic change with time | smooth area | edge area | constantly inclined area | complicate pattern |
| Correction level | correction : small | correction : small | correction : small | correction : small | correction : large | correction : small |

FIG. 3

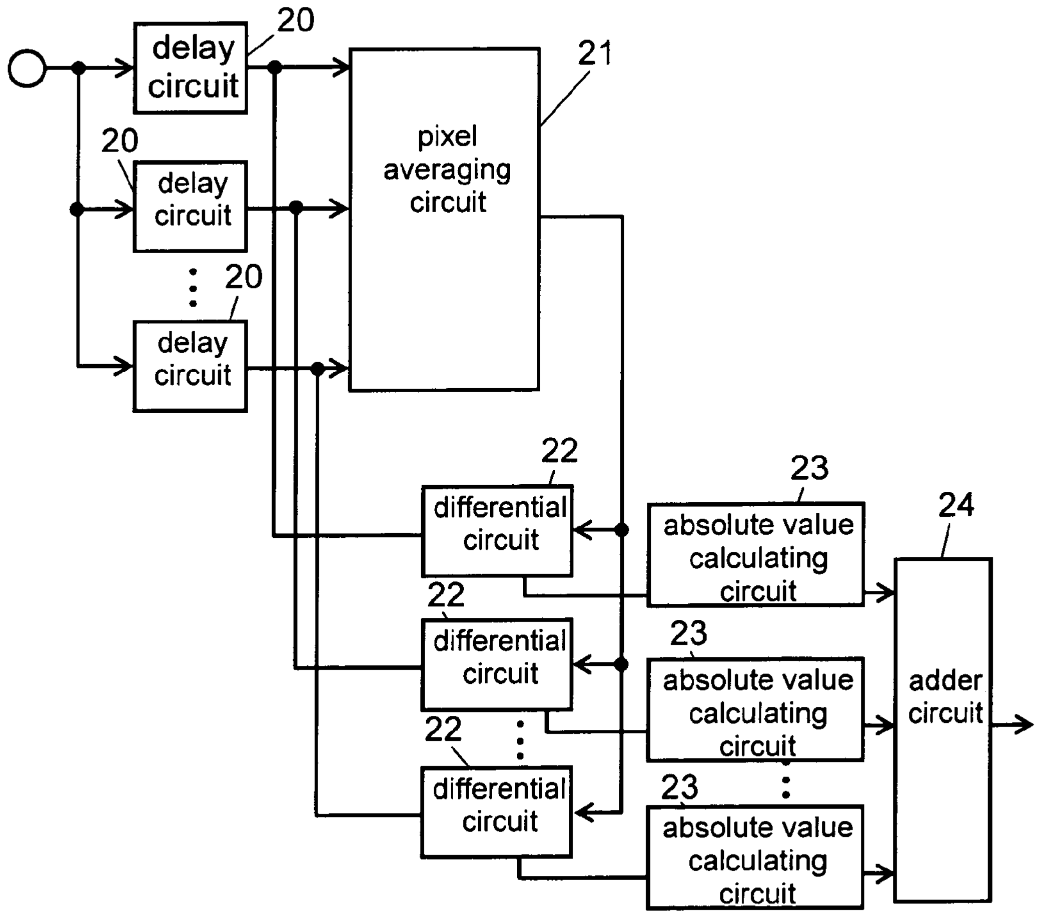

FIG. 4
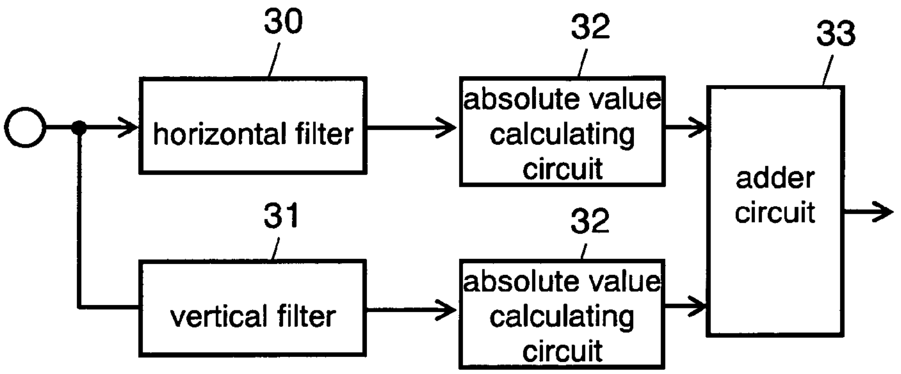
FIG. 5A
horizontal filter
| | | |
|---|---|---|
| 1 | 0 | -1 |
| 1 | 0 | -1 |
| 1 | 0 | -1 |
FIG. 5B
vertical filter
| | | |
|---|---|---|
| 1 | 1 | 1 |
| 0 | 0 | 0 |
| -1 | -1 | -1 |
FIG. 6
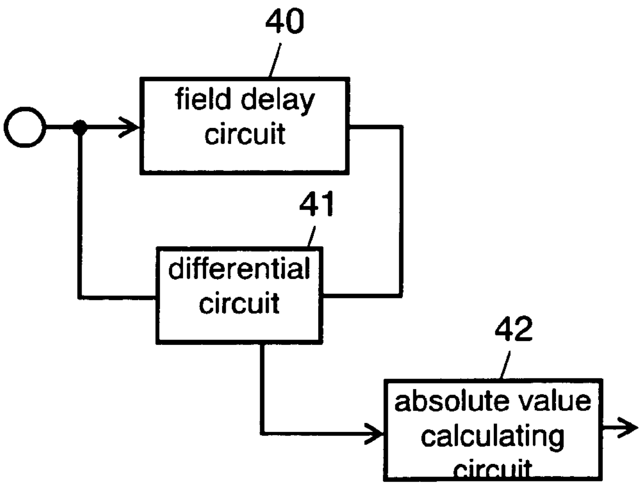

FIG. 12

| | SF1 | SF2 | SF3 | SF4 | SF5 | SF6 | SF7 | SF8 | SF9 | SF10 |
|---|---|---|---|---|---|---|---|---|---|---|
| input gradation values | 1 | 2 | 4 | 8 | 16 | 24 | 32 | 40 | 56 | 72 |
| 0~7 | | | | | | | | | | |
| 8~15 | | | | 1 | | | | | | |
| 16~23 | | | | | 1 | | | | | |
| 24~31 | | | | 1 | 1 | | | | | |
| 32~39 | | | | 1 | | 1 | | | | |
| 40~47 | | | | | 1 | 1 | | | | |
| 48~55 | | | | 1 | 1 | 1 | | | | |
| 56~63 | | | | 1 | 1 | | 1 | | | |
| 64~71 | | | | 1 | | 1 | 1 | | | |
| 72~79 | | | | | 1 | 1 | 1 | | | |
| 80~87 | | | | 1 | 1 | 1 | 1 | | | |
| 88~95 | | | | 1 | 1 | 1 | | 1 | | |
| 96~103 | | | | 1 | 1 | | 1 | 1 | | |
| 104~111 | | binary | | 1 | | 1 | 1 | 1 | | |
| 112~119 | | | | | 1 | 1 | 1 | 1 | | |
| 120~127 | | | | 1 | 1 | 1 | 1 | 1 | | |
| 128~135 | | | | | 1 | 1 | 1 | | 1 | |
| 136~143 | | | | 1 | 1 | 1 | 1 | | 1 | |
| 144~151 | | | | 1 | 1 | 1 | | 1 | 1 | |
| 152~159 | | | | 1 | 1 | | 1 | 1 | 1 | |
| 160~167 | | | | 1 | | 1 | 1 | 1 | 1 | |
| 168~175 | | | | | 1 | 1 | 1 | 1 | 1 | |
| 176~183 | | | | 1 | 1 | 1 | 1 | 1 | 1 | |
| 184~191 | | | | | 1 | 1 | 1 | 1 | | 1 |
| 192~199 | | | | 1 | 1 | 1 | 1 | 1 | | 1 |
| 200~207 | | | | | 1 | 1 | 1 | | 1 | 1 |
| 208~215 | | | | 1 | 1 | 1 | 1 | | 1 | 1 |
| 216~223 | | | | 1 | 1 | 1 | | 1 | 1 | 1 |
| 224~231 | | | | 1 | 1 | | 1 | 1 | 1 | 1 |
| 232~239 | | | | 1 | | 1 | 1 | 1 | 1 | 1 |
| 240~247 | | | | | 1 | 1 | 1 | 1 | 1 | 1 |
| 248~255 | | | | 1 | 1 | 1 | 1 | 1 | 1 | 1 |

FIG. 13 maximum gradation correction ↓ (7) … minimum gradation correction ↓ (0)

| | 7 | 6 | 5 | 4 | 3 | 2 | 1 | 0 |
|---|---|---|---|---|---|---|---|---|
| input gradation values | 4 | 8 | 16 | 24 | 32 | 40 | 56 | 72 |
| 0~7 | ● | ● | ● | ● | ● | ● | ● | ● |
| 8~15 | ● | ● | ● | ● | ● | ● | ● | ● |
| 16~23 | | ● | ● | ● | ● | ● | ● | ● |
| 24~31 | ● | ● | ● | ● | ● | ● | ● | ● |
| 32~39 | | | ● | ● | ● | ● | ● | ● |
| 40~47 | | ● | ● | ● | ● | ● | ● | ● |
| 48~55 | ● | ● | ● | ● | ● | ● | ● | ● |
| 56~63 | | | | ● | ● | ● | ● | ● |
| 64~71 | | | ● | ● | ● | ● | ● | ● |
| 72~79 | | ● | ● | ● | ● | ● | ● | ● |
| 80~87 | ● | ● | ● | ● | ● | ● | ● | ● |
| 88~95 | | | | | ● | ● | ● | ● |
| 96~103 | | | | ● | ● | ● | ● | ● |
| 104~111 | | | ● | ● | ● | ● | ● | ● |
| 112~119 | | ● | ● | ● | ● | ● | ● | ● |
| 120~127 | ● | ● | ● | ● | ● | ● | ● | ● |
| 128~135 | | | | | | | ● | ● |
| 136~143 | | | | | | ● | ● | ● |
| 144~151 | | | | | ● | ● | ● | ● |
| 152~159 | | | | ● | ● | ● | ● | ● |
| 160~167 | | | ● | ● | ● | ● | ● | ● |
| 168~175 | | ● | ● | ● | ● | ● | ● | ● |
| 176~183 | ● | ● | ● | ● | ● | ● | ● | ● |
| 184~191 | | | | | | | | ● |
| 192~199 | | | | | | | ● | ● |
| 200~207 | | | | | | | ● | ● |
| 208~215 | | | | | | ● | ● | ● |
| 216~223 | | | | | ● | ● | ● | ● |
| 224~231 | | | | ● | ● | ● | ● | ● |
| 232~239 | | | ● | ● | ● | ● | ● | ● |
| 240~247 | | ● | ● | ● | ● | ● | ● | ● |
| 248~255 | ● | ● | ● | ● | ● | ● | ● | ● |

FIG. 14

SF1 SF10

| input gradation values | 1 | 2 | 4 | 8 | 16 | 24 | 32 | 40 | 56 | 72 |
|---|---|---|---|---|---|---|---|---|---|---|
| 0~7 | | | | | | | | | | |
| 8~15 | | | | 1 | | | | | | |
| 16~23 | | | | | 1 | | | | | |
| 24~31 | | | | 1 | 1 | | | | | |
| 32~39 | | | | 1 | | 1 | | | | |
| 40~47 | | | | | 1 | 1 | | | | |
| 48~55 | | | | 1 | 1 | 1 | | | | |
| 56~63 | | | | 1 | 1 | | 1 | | | |
| 64~71 | | | | 1 | | 1 | 1 | | | |
| 72~79 | | | | | 1 | 1 | 1 | | | |
| 80~87 | | | | 1 | 1 | 1 | 1 | | | |
| 88~95 | | | | 1 | 1 | 1 | | 1 | | |
| 96~103 | | | | 1 | 1 | | 1 | 1 | | |
| 104~111 | binary | | | 1 | | 1 | 1 | 1 | | |
| 112~119 | | | | | 1 | 1 | 1 | 1 | | |
| 120~127 | | | | 1 | 1 | 1 | 1 | 1 | | |
| 128~135 | | | | | 1 | 1 | 1 | | 1 | |
| 136~143 | | | | 1 | 1 | 1 | 1 | | 1 | |
| 144~151 | | | | 1 | 1 | 1 | | 1 | 1 | |
| 152~159 | | | | 1 | 1 | | 1 | 1 | 1 | |
| 160~167 | | | | 1 | | 1 | 1 | 1 | 1 | |
| 168~175 | | | | | 1 | 1 | 1 | 1 | 1 | |
| 176~183 | | | | 1 | 1 | 1 | 1 | 1 | 1 | |
| 184~191 | | | | | 1 | 1 | 1 | 1 | | 1 |
| 192~199 | | | | 1 | 1 | 1 | 1 | 1 | | 1 |
| 200~207 | | | | | 1 | 1 | 1 | | 1 | 1 |
| 208~215 | | | | 1 | 1 | 1 | 1 | | 1 | 1 |
| 216~223 | | | | 1 | 1 | 1 | | 1 1 | 1 | 1 |
| 224~231 | | | | 1 | 1 | | 1 | 1 | 1 | 1 |
| 232~239 | | | | 1 | | 1 | 1 | 1 | 11 | 1 |
| 240~247 | | | | | 1 | 1 | 1 | 1 | 1 | 1 |
| 248~255 | | | | 1 | 1 | 1 | 1 | 1 | 1 | 1 |

a b

FIG. 21
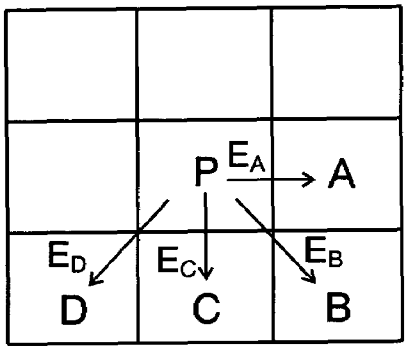
FIG. 22
| | $E_A$ | $E_B$ | $E_C$ | $E_D$ |
|---|---|---|---|---|
| θ still picture | 7 | 1 | 5 | 3 |
| 180° 0° ⇄ | 10 | 3 | 0 | 3 |
| 225° 45° ↖↘ | 3 | 10 | 3 | 0 |
| 270° 90° ↑ ↓ | 0 | 3 | 10 | 3 |
| 315° 135° ↗↙ | 3 | 0 | 3 | 10 |
FIG. 23
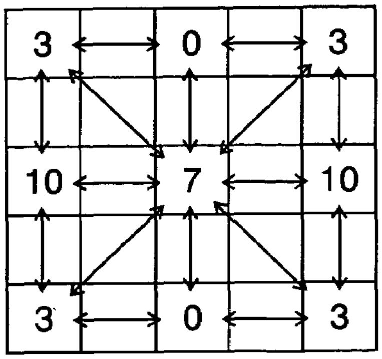

GRADATION DISPLAY DEVICE

TECHNICAL FIELD

The present invention relates to a gradation display device using sub-fields. More particularly, it relates to a gradation display device capable of decreasing gradation disturbances—known as dynamic false contours—when moving image is shown on the screen.

BACKGROUND ART

In a image display device employing sub-fields to display gradation levels, such as a plasma display panel (PDP), image quality has often degraded by a noise generated in displaying moving image, known as dynamic false contours.

It is well known in those skilled in the art that the dynamic false contours can be suppressed by increasing the number of the sub-fields. In some kinds of the devices, such as PDPs, however, increase in the number of the sub-fields makes difficult to hold sufficient time for emission, resulting in lack of luminance. To address the problem above, some attempts have been made. For example, Japanese Patent Unexamined Publication No. 2000-276100 suggests that the number of the sub-fields should be kept relatively small and combinations of the sub-fields corresponding to the gradation level of an image to be shown should be controlled in the area susceptible to the dynamic false contours to enhance both of the moving image quality and luminance.

Employing the method, the conventional device limits the number of the gradation levels fro image display in the area showing moving image, and shows image by using a combination of gradation values relatively unsusceptible to the dynamic false contours; on the other hand, to maintain consistent gradation levels, a dithering process produces substantial gradation levels.

However, the conventional display device, detection of moving pictures was not designed to precisely correspond to the gradation display method employing the sub-fields; it has been waited for improvement in accurate detection in areas in which the dynamic false contours are prominently observed, or likely to occur.

To address the problem above, the present invention provides a gradation display device with a simple circuit structure, which can accurately detect the areas in which the dynamic false contours likely to occur.

DISCLOSURE OF THE INVENTION

To address the problem above, according to the gradation display device of the present invention, a TV field is divided into multiple sub-fields each of which has a predetermined weight of luminance. With the multiple sub-fields, the device provides gradation display. The device contains a gradient detector for detecting a gradient of gray-scale values of pixels of an image fed into the device; a time-varying gradation-value detector for detecting changes in the gradation values of pixels with the passage of time; an image detector for detecting the magnitude and direction of movement of the incoming image according to the outputs from the gradient detector and the time-varying gradation-value detector; and a signal corrector for correcting signals of the incoming image according to the detected magnitude and direction of the image and a weight of luminance assigned to each sub-field so as to display proper image on the screen.

BRIEF DESCRIPTION OF THE DRAWINGS

FIG. 2 shows correction levels corresponding to characteristics of images and ranges.

FIG. 3 is a block diagram illustrating an example of a smoothness detecting circuit of the device.

FIG. 4 is a block diagram illustrating an example of a gradient detecting circuit of the device.

FIG. 5 shows a pattern of coefficients used for a filter of the gradient detecting circuit.

FIG. 6 is a block diagram illustrating a detection of time-varying gradation values of the device.

FIG. 12 shows a combination of the weights of luminance and emission assigned to each sub-field of the device.

FIG. 13 shows how to encode in an encoding circuit of the device.

FIG. 14 shows the relation between a direction of gradient in an image appearing area and a moving direction of an image in a gradation display device of another embodiment of the invention.

FIG. 21 illustrates a general error-variance coefficient.

FIG. 22 illustrates the control method of error-variance of the device of the invention.

FIG. 23 shows transition of error-variance coefficient EA of the device.

DETAILED DESCRIPTION OF CARRYING OUT OF THE INVENTION

The gradation display device of an embodiment of the present invention will be described hereinafter with reference to the accompanying drawings.

First Exemplary Embodiment

Figure 1:
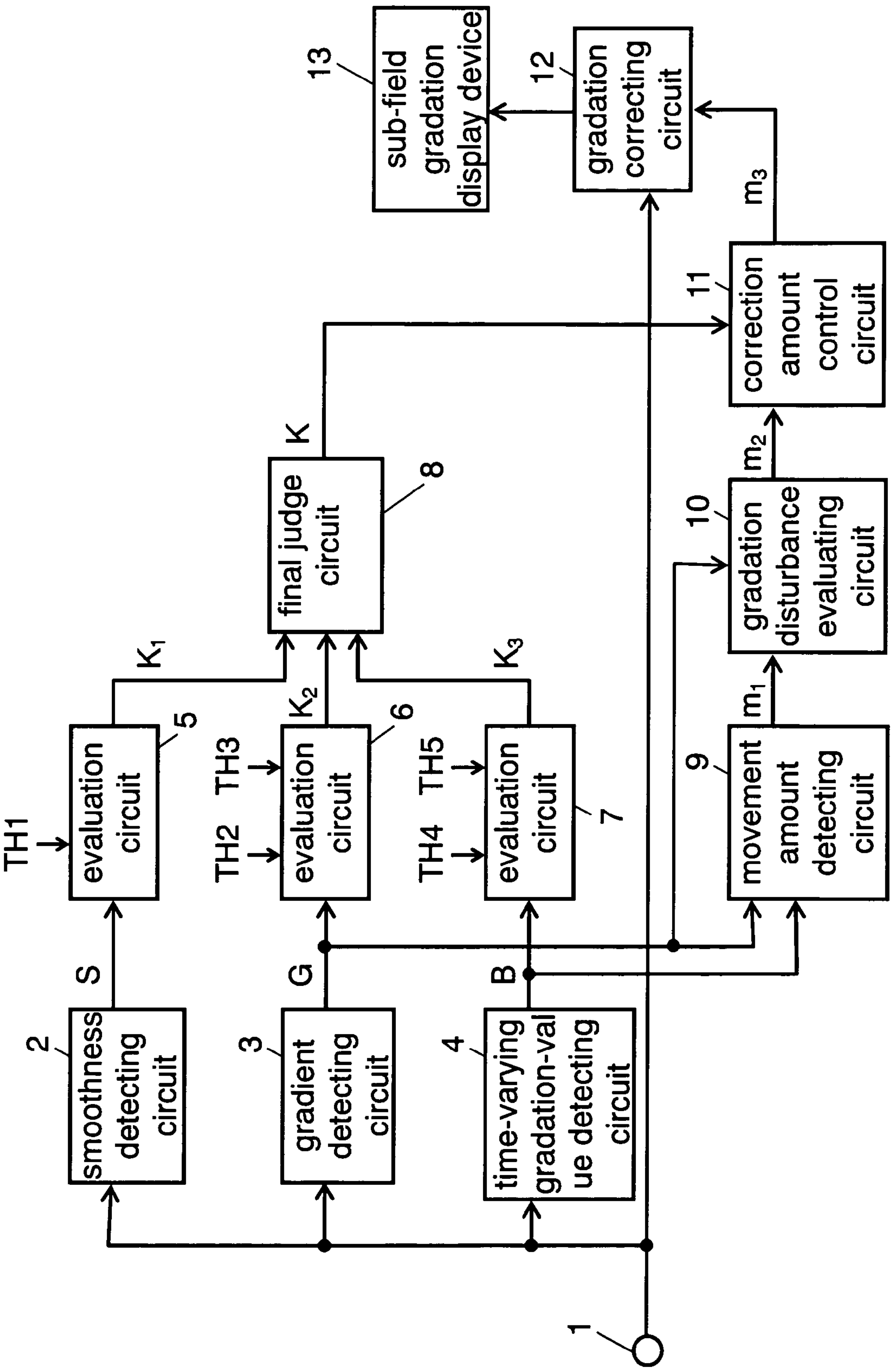
FIG. 1 is a block diagram illustrating the structure of the gradation display device of an embodiment of the present invention.

FIG. 1 is a block diagram illustrating the structure of the gradation display device of an embodiment of the present invention. In FIG. 1, image signals entered through input terminal 1 are fed into smoothness detecting circuit 2 as a smoothness detector, gradient detecting circuit 3 as a gradient detector, and time-varying gradation-value detecting circuit 4 as a time-varying gradation-value detector for detecting changes in the gradation values of pixels with the passage of time. Smoothness detecting circuit 2 detects smoothness in the gradation values of pixels of an incoming image. Gradient detecting circuit 3 detects a gradient in the gradation values of pixels in a display area.

The outputs from smoothness detecting circuit 2, gradient detecting circuit 3, and time-varying gradation-value detecting circuit 4 are compared with each predetermined threshold in evaluation circuits 5, 6, and 7, respectively. Receiving the outputs from evaluation circuits 5, 6, and 7, final judge circuit 8 outputs final judge result k.

Evaluation circuit 5 has definable threshold TH1. Receiving output S from smoothness detecting circuit 2, evaluation circuit 5 compares output S with threshold TH1, and outputs judge result k1. Evaluation circuit 6 has two definable thresholds TH2 and TH3. Receiving output G from gradient detecting circuit 3, evaluation circuit 6 compares output G with thresholds TH2 and TH3, and outputs judge result k2. Similarly, evaluation circuit 7 has two definable thresholds TH4 and TH5. Receiving output B from time-varying gradation-value detecting circuit 4, evaluation circuit 7 compares output B with thresholds TH4 and TH5, and outputs judge result k3. Judge results k1, k2, and k3 are fed into final judge circuit 8.

Movement amount detecting circuit 9 receives output G from gradient detecting circuit 3 and output B from time-varying gradation-value detecting circuit 4. According to the outputs, movement amount detecting circuit 9 detects magnitude and direction of movement of an image to be entered. Gradation disturbance evaluating circuit 10 receives output G from gradient detecting circuit 3 and output m1 from movement amount detecting circuit 9. Receiving output m2 from gradation disturbance evaluating circuit 10 and final judge result k from final judge circuit 8, correction amount control circuit 11 outputs output m3, which controls gradation correcting circuit 12 as a signal corrector.

Receiving image signals from input terminal 1 and output m3 from correction amount control circuit 11, gradation correcting circuit 12 outputs data to sub-field gradation display device 13. That is, according to the magnitude and direction of movement of an image (detected at movement amount detecting circuit 9) and a weight of luminance assigned to the sub-field of an incoming image signal, gradation correcting circuit 12 corrects the image signal for displaying image properly.

Hereinafter will be described in detail the workings of each section of the gradation display device.

In FIG. 1, according to each output from smoothness detecting circuit 2, gradient detecting circuit 3 and time-varying gradation-value detecting circuit 4, evaluation circuits 5, 6, and 7 detect characteristics of a target pixel or an image of a target area. FIG. 2 shows combination patterns of characteristics and corresponding correction control.

In FIG. 2, evaluation circuits 5, 6, and 7 receive the outputs from detecting circuits 2, 3 and 4, respectively, and compare the outputs with each threshold to determine the characteristics of the incoming image. The results are further fed into final judge circuit 8, where the target area is put into one of the six groups: "no change with time", "drastic change with time", "smooth area", "edge area", "constantly inclined area", and "complicate pattern". Final judge circuit 8 determines final judge result k according to the group to which the target area is classified. An inequality sign in FIG. 2 represents the relation in magnitude between the characteristics of an image and a threshold. In each combination of outputs S, G, and B, "x" is given to an output that does not work as a key factor in the correction control.

Evaluation circuit 5 determines, as shown in FIG. 2, the range that satisfies $S \geqq TH1$ (where, S represents smoothness of the target area, TH1 represents the threshold given to evaluation circuit 5). Evaluation circuit 6 determines the range that satisfies $TH2 \leqq G \leqq TH3$ (where, G represents gradient of the gradation value of the target area, TH2 and TH3 represent the thresholds given to evaluation circuit 6). Similarly, evaluation circuit 7 determines the range that satisfies $TH4 \leqq B \leqq TH5$ (where, B represents the changes with time in gradation values in the target area, TH4 and TH5 represent the thresholds of evaluation circuit 7). Receiving the results above, final judge circuit 8 determines the pixels included in the range as the area in which the dynamic false contour is likely expected, or easily detected, and provides the area with gradational correction for proper display.

The dynamic false contour is conspicuously observed in the area having following conditions: each of the gradient of gradation values of pixels forming image and changes with time in gradation values of the pixels stays in a range having a moderate upper limit and lower limit; and the image pattern is relatively smooth. The device of the present invention selectively detects such areas.

Now will be described each example of smoothness detecting circuit 2, gradient detecting circuit 3, and time-varying gradation-value detecting circuit 4. First, smoothness detecting circuit 4 contains, as shown in FIG. 3, delay circuits 20, pixel averaging circuit 21, differential circuits 22, absolute value calculating circuits 23, and adder circuit 24. Delay circuits 20 provide each pixel signal with a delay according to an image signal from input terminal 1; pixel averaging circuit 21 receives the pixel signals from delay circuits 20 and averages the gradation values of the pixel signals; differential circuits 22 obtain the difference between the gradation value of each pixel signal and the average value by calculating the difference between the output from pixel averaging circuit 21 and the outputs from delay circuits 20; absolute value calculating circuits 23 calculate the absolute values of the differential values obtained at differential circuits 22; and adder circuit 24 outputs smoothness of the gradation value of each pixel of incoming image signals by adding the absolute values received from absolute value calculating circuits 23.

Gradient detecting circuit 3 contains, as shown in FIG. 4, horizontal filter 30 for detecting horizontal changes in gradation values of pixels, vertical filter 31 for detecting vertical changes in gradation values of pixels; absolute value calculating circuit 32 for calculating each absolute value of the outputs fed from filters 30 and 31; and adder circuit 33 for adding the two outputs from absolute value calculating circuit 32. Each of filters 30 and 31 multiplies the pixels adjacent to the target pixel by a predetermined coefficient and then add the results each other. FIGS. 5A and 5B show examples of the coefficients used for the filters. Receiving image signals from input terminal 1, horizontal filter 30 and vertical filter 31 detect horizontal and vertical changes in the gradation value of pixels. Adding the absolute values of each output from the filters can detect a gradient of the gradation value of pixels of incoming image signals.

Time-varying gradation-value detecting circuit 4 contains, as shown in FIG. 6, field delay circuit 40, differential circuit 41, and absolute value calculating circuit 42. Field delay circuit 40 delays signals corresponding to one field of incoming image signal. Differential circuit 41 calculates the difference between the gradation value of pixels of current image signal and the gradation value of pixels of one-field-before image signal fed from delay circuit 40. Absolute value calculating circuit 42 calculates the absolute value of the output from differential circuit 41. With the structure above, time-varying gradation-value detecting circuit 4 detects changes in the gradation value of target pixels with the passage of time by calculating the difference between the gradation value of pixels of current image signal and the gradation value of pixels of one-field-before image signal.

Figure 7A:
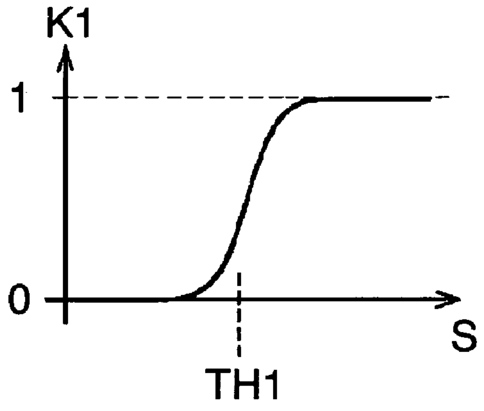
FIG. 7 shows characteristics of an evaluation circuit of the device.
Figure 7B:
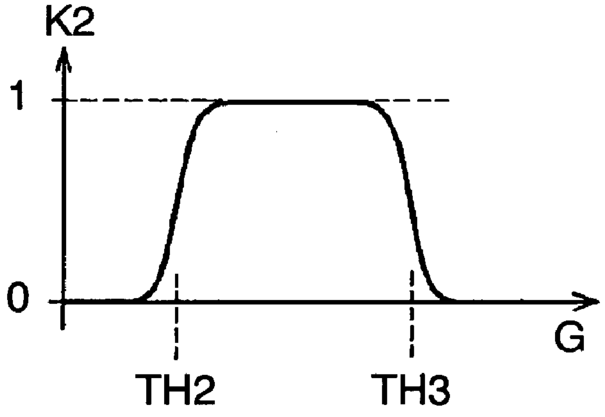
Figure 7C:
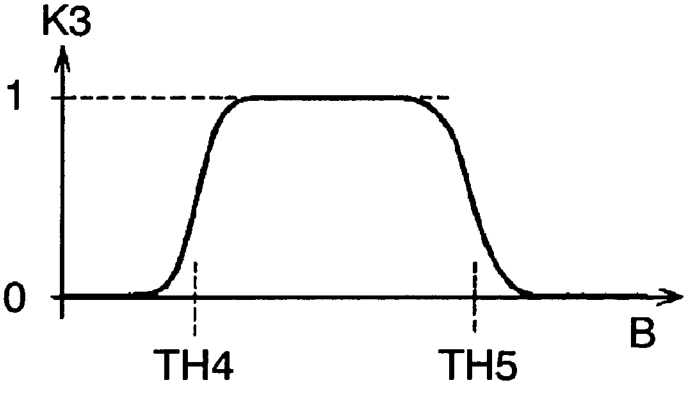

Although FIG. 2 shows two levels—"correction: small", "correction: large" for the sake of simplicity, the gradational correction of the device has multi-levels at least three. The device can continuously switch the correction levels to provide smooth correction. FIGS. 7A, 7B, and 7C show the characteristics of evaluation circuits 5, 6, and 7, respectively. The characteristics of the circuits shown in FIGS. 7A through 7C can realize the smooth correction of the gradational display.

The working of evaluating circuits 5, 6, and 7 will be described with reference to the characteristics shown in FIG. 7A through FIG. 7C.

Receiving smoothness S fed from detecting circuit 2, evaluating circuit 5 compares S with TH1 that is the threshold given to circuit 5. As shown in FIG. 7A, when S has a value close to TH1, the output of evaluation circuit 5 takes a value between 0 and 1. When S is smaller than TH1, the output takes a value closer to 0, on the other hand, when S is greater than TH1, the output takes a value closer to 1.

Receiving gradient G fed from detecting circuit 3, evaluating circuit 6 compares G with TH2 and TH3 that are the thresholds given to circuit 6. When G takes a value between TH2 and TH3, as shown in FIG. 7B, the output of evaluating circuit 6 takes a value closer to 1; otherwise, the output takes a value closer to 0.

Receiving output B (where, B represents the change with time of the gradation value) fed from detecting circuit 3, evaluating circuit 7 compares B with TH4 and TH5 that are the thresholds given to circuit 7. When B takes a value between TH4 and TH5, as shown in FIG. 7C, the output of evaluating circuit 7 takes a value closer to 1; otherwise, the output takes a value closer to 0. It will be understood that each output of evaluating circuits 5, 6, and 7 may take a shape with a stepped change.

Figure 8:
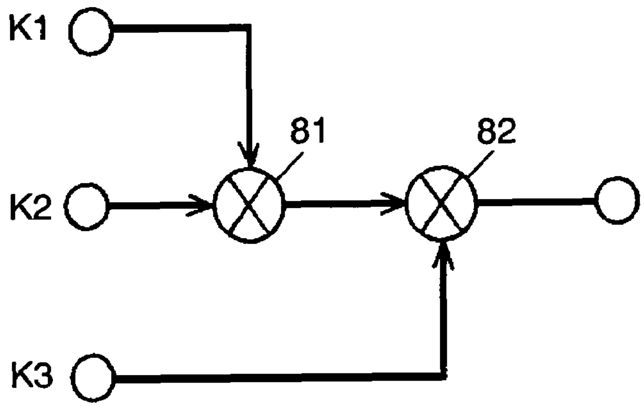
FIG. 8 shows how the final judge is obtained.

Final judge circuit 8 outputs final judge result k. Having multipliers 81 and 82 in the structure, as shown in FIG. 8, final judge circuit 8 calculates the product of k1, k2, and k3 fed from evaluating circuits 5, 6, and 7, respectively. According to the characteristics of image from circuits 5 through 7, final judge circuit 8 properly outputs final judge result k.

On the other hand, magnitude of the movement of an image, i.e., the amount of the movement and the direction of the movement of the image are detected in movement amount detecting circuit 9 according to gradient G fed from gradient detecting circuit 3 and time-varying gradation value B fed from time-varying gradation-value detecting circuit 4. In theory, the calculation can be carried out by the following method on the assumption that the gradation value of an image changes with the shape of the showing object maintained.

Figure 9:
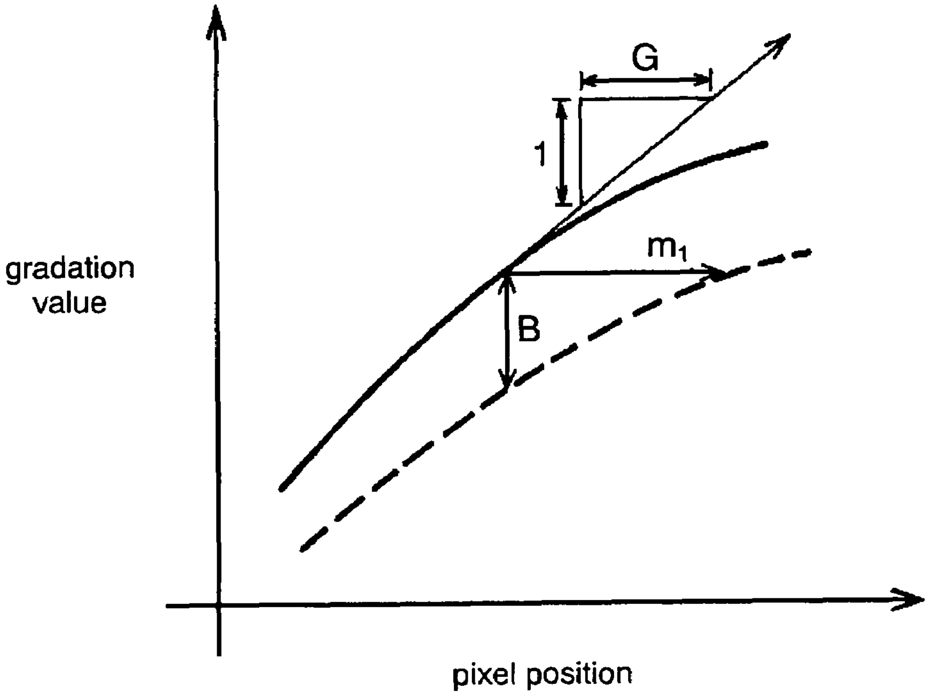
FIG. 9 illustrates how to calculate the amount of movement of an image from the gradient and the time-varying gradation values.

Based on the premise that the amount of movement of an image is, as shown in FIG. 9, in proportion to B (which represents the change with time of the gradation value of the target area), and in inverse proportion to changes in gradation values in the screen, i.e., gradient B, the amount of movement of an image represented by m1 is obtained by the expression: m1=B/G. However, the aforementioned assumption does not hold for an area in which gradient G has a great change, so that the amount of movement cannot be accurately detected. Similarly, in the area where gradient G is extremely small, the denominator of the expression takes a small value. In this case, too, an accurate detection cannot be provided. Furthermore, when the change with time in gradation values is very small, the dynamic false contour hardly occurs. In contrast, when the change with time in gradation values is considerably large, even if the dynamic false contour appears on the screen, it would hardly be perceptible as a dynamic false contour. Considering to the facts above, the limited combinations of characteristics of images (FIG. 2) enable to provide an accurate detection of the movement of images in the area where the dynamic false contour is likely to occur. That is, correction of the dynamic false contour according to output k fed from final judge circuit 8 can accurately detect the movement of images and properly correct image signals.

The amount of movement through the calculation in movement amount detecting circuit 9 can be accurately obtained as long as the characteristics of images satisfy the aforementioned conditions. However, the amount of movement detected here represents the number of pixels per unit of time, which is a physical quantity essentially differ from the dynamic false contour as a disturbance in gradational display. Besides, the detected amount may not completely agree with a visual evaluation of actually recognized dynamic false contour.

Figure 10:
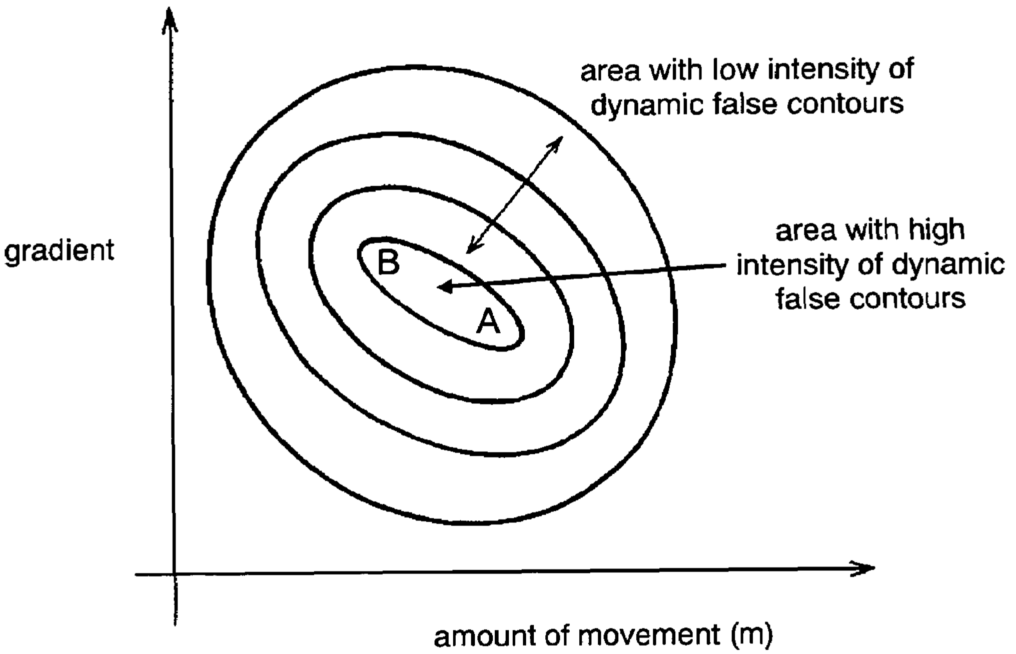
FIG. 10 shows the characteristics of a gradation disturbance evaluating circuit of the device.

To provide more accurate detection, the device of the present invention contains gradation disturbance evaluating circuit 10 having dimensional input/output characteristics shown in FIG. 10. Gradation disturbance evaluating circuit 10 determines disturbance in gradation values represented by m2. Receiving m1 (which represents the amount of movement of image, or the number of pixels per unit of time) fed from movement amount detecting circuit 9, evaluation circuit 10 converts m1 into m2 and sends it to correction amount control circuit 11.

FIG. 10 shows that gradation disturbance evaluating circuit 10 has characteristics in which the dynamic false contour has a maximum value at a mean value of the amount of movement when the amount of movement is changed with respect to a constant gradient. That is, the characteristics of evaluating circuit 10 shows that the dynamic false contour intensely occurs in the area having a large amount of movement with the gradient kept relatively small (such as at A of FIG. 10), and in the area having a large gradient with the amount of movement kept relatively small (such as at B of FIG. 10).

Correction amount control circuit 11 is formed of, for example, a multiplier (not shown). Receiving m2 that represents calculated disturbance in gradation values from circuit 10, correction amount control circuit 11 outputs gradation correcting signal m3 as the product of m2 and final judge coefficient k.

Receiving gradation correcting signal m3, gradation correcting circuit 12 performs gradational correction according to the structure of sub-fields, movement of images, and gradation values, thereby minimizing dynamic false contours inevitably generated in image display employing sub-fields. Gradation correcting circuit 12 is formed of, as shown in FIG. 11, a combination of an encoding circuit and a feedback circuit.

Figure 11:
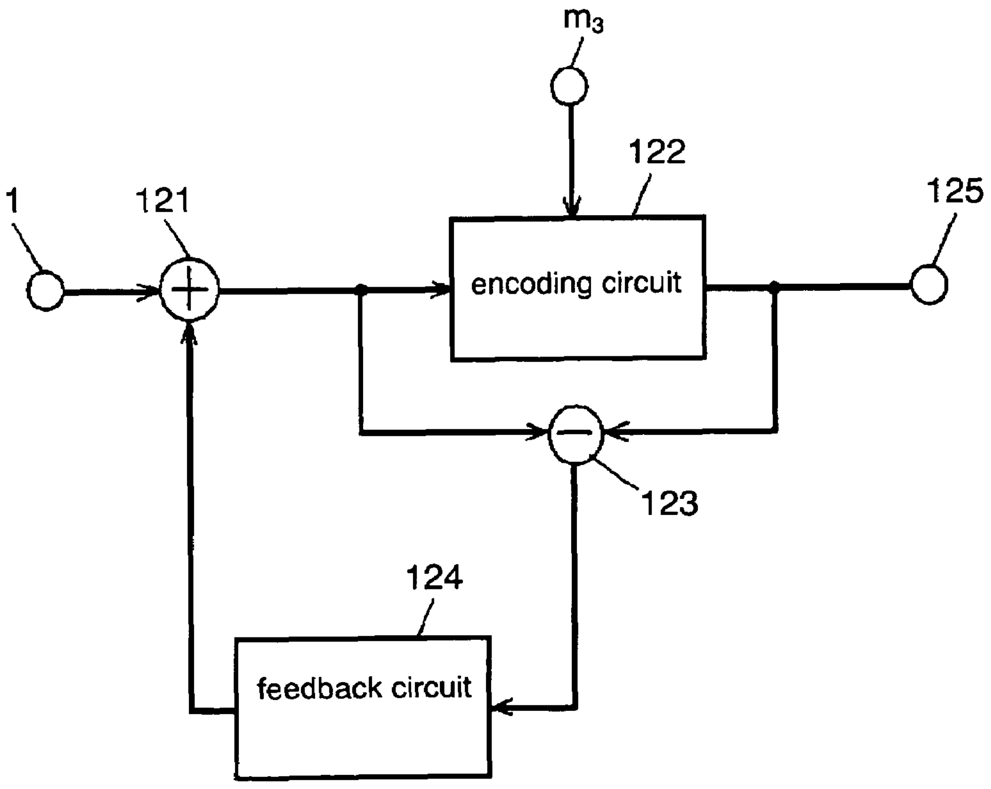
FIG. 11 illustrates the characteristics of a gradation correcting circuit of the device.

In FIG. 11, an image signal from input terminal 1 is fed to encoding circuit 122 via adder 121. In encoding circuit 122, the image signal undergoes a predetermined encoding process and goes out from output terminal 125. In the process, subtracter 123 calculates the difference in the signal between pre-encoding and post-encoding. The difference is fed to feedback circuit 124 and then added to an input signal in adder 121. In general, feedback circuit 124 contains a plurality of delay elements and coefficient circuits, and gradational control is carried out in encoding circuit 122. That is, gradation correcting circuit 12 performs an error-variance process.

FIG. 12 shows an encoding method used for gradation display device 13, which is formed of a combination of the weights of luminance and emission assigned to each sub-field. FIG. 12 introduces the combination using ten sub-fields of SF1 through SF10. The weighting ratio of luminance assigned to the ten sub-fields are 1, 2, 4, 8, 16, 24, 32, 40, 56, and 72. FIG. 12 shows an encoding method of sub-field assignment corresponding to the gradation value of an incoming image. In the table, numeral '1' is given to a sub-field having emission.

FIG. 13 introduces an encoding method used in encoding circuit 122 of FIG. 11, showing the weight of luminance assigned to the sub-fields and the encoding method of the weighting. For a small amount of correction, the device performs gradation control using many gradation levels. In contrast, for a large amount of correction, the device performs gradation control using fewer gradation levels, and at the same time, shows image using substantial gradation levels obtained by error-variance. FIG. 13 shows eight levels of gradational correction of 0-7. A dot is given to a gradation value to be used. The gradation control is performed so that all the gradation levels can be used when the amount of gradational correction takes 0, and the number of the gradation levels is kept at a minimum when the amount of gradational correction takes 7. With the gradation control above, the device provides a larger amount of correction in an area where an intense dynamic false contour is expected, thereby maintaining the correlation between the gradational levels and luminance distribution of the sub-fields, which prevents the dynamic false contours. The device provides a smaller amount of correction as the occurrence of the dynamic false contour decreases, allowing the image on the screen to have a continuous gradational correction. As a result, the device can realize a smooth control for suppressing the dynamic false contour and proper gradational correction also in an area having no dynamic false contours.

According to the embodiment of the present invention, as described above, the device contains a detecting unit for detecting magnitude and direction of movement of incoming image according to a gradient of the image in the screen and changes with time in gradation values; and a signal correcting unit for correcting an incoming image signal according to the magnitude and direction of the movement of the image and a weight of luminance assigned to the sub-fields. With the simple structure, the device can provide proper gradational display.

A conventionally well known method of calculating the movement itself of images from a gradient of the images and changes in gradation values with the passage of time is introduced, for example, in *Multidimensional Signal Processing for TV image*, pp. 202-207, Takahiko Fukinuki, Nov. 15, 1988. The gradient method described in the book above is effective in the case where the movement of images is relatively small; it has not be widely used in practice.

To address the pending problems above, the inventors examined the behavior of the dynamic false contour generated in a display device employing the sub-fields, and found how the structure of the sub-fields, characteristics of image, the movement amount of image affect on the occurrence of the dynamic false contour. The analysis tells that the location and intensity of the dynamic false contour can be easily detected as long as both of the gradient of gradation values and the changes in gradation values with the passage of time stay in each range having a predetermined upper limit and a lower limit. Besides, the gradient and the changes in gradation values allow the movement of images to be almost perfectly detected. Employing the detection above, the simply structured device of the present invention can offer excellent visibility in both of moving image and still image.

Although the inventive concepts—weighting of luminance to the sub-fields, encoding the sub-fields, evaluating the amount of gradation disturbance from the movement amount of image, correcting gradation, and the like—have been shown and described above, it will be understood that many changes and modifications may be made.

Second Exemplary Embodiment

Here will be described another embodiment of the present invention. For the gradational control, the device of the present invention employs an amount of correction, which is acquired by totally evaluating the smoothness of gradation values of an incoming image signal and the gradient of the gradation values, and changes in gradation values with the passage of time. The structure of the embodiment focuses on the relation between the direction of the gradient of the gradation values and the direction of changes in gradation values with the passage of time. With the structure, intensity of the dynamic false contour is further accurately detected for the proper image correction. Compared to the structure shown in FIG. 1, the device of the embodiment has the same structure, except for the internal structure and the working of gradation disturbance evaluating circuit 10. The description will be focused on the difference.

FIG. 14 shows the relation between a direction of gradient in an image appearing area and a moving direction of the image in the gradational display device of the embodiment. The table of FIG. 14 is the same as that shown in FIG. 12 but for solid-lined arrow a and dot-lined arrow b. The two arrows illustrate the difference in amount of the dynamic false contour generated when a viewer watches an image that is moving opposite to an image area where the gradient of gradation is uniform.

For example, suppose that a lamp waveform having a gradation value of 200 as a mean value is moving in the screen. When an image moves in a direction opposite to the increasing direction of the gradation values (indicated by arrow a), the amount of emission of the sub-fields are observed smaller than the amount should be actually measured. This leads to a relatively intense dynamic false contour. In contrast, when an image moves along in the increasing direction of the gradation values (indicated by arrow b), the amount of emission of the sub-fields are observed slightly larger than that should be actually measured; compared to the movement in the opposite direction, however, the amount is relatively small. As a result, the intensity of the dynamic false contour becomes relatively low.

In evaluating the intensity of the dynamic false contour from the movement of an image, as described above, further accurate image correction can be obtained by changing the amount of image correction according to the correlation between the moving direction of an image and the direction of the gradient of gradation values in the screen.

Figure 15:
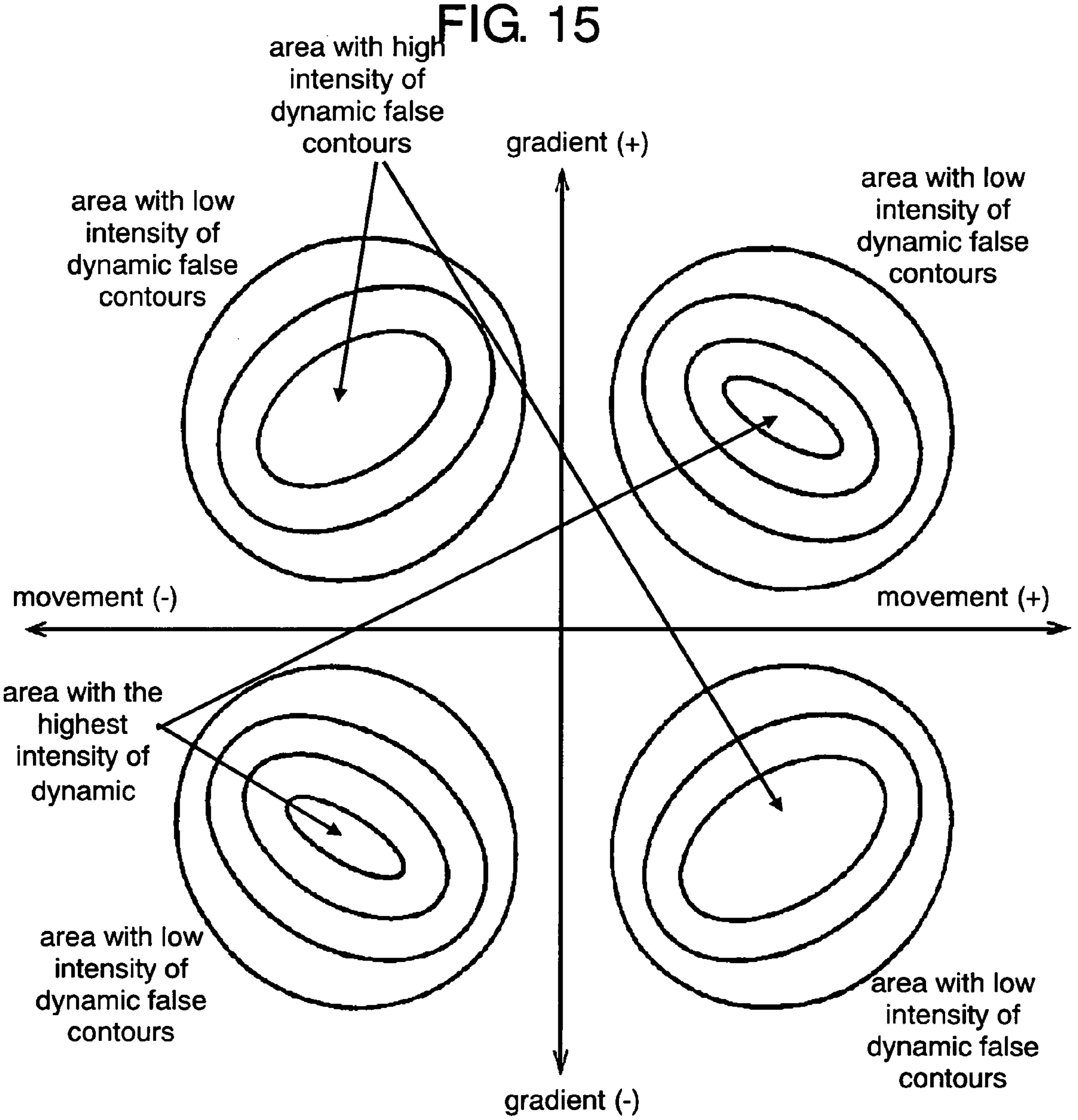
FIG. 15 shows evaluation of gradation disturbance of the device.

FIG. 15 illustrates the control of the image correction above, showing the magnitude and direction of movement of an image, and evaluation of gradational disturbance with respect to the gradient of gradation values. The graph shows the function having two dependent variables, i.e., movement of image represented by the horizontal axis, and gradient of image represented by the vertical axis. A value defined by the function in a vertical upward direction from the surface of the paper represents an amount of gradation disturbance, that is, the evaluation value of the dynamic false contour.

The device of the embodiment, as is apparent from FIG. 15, changes the amount of image correction according to the combination of the moving direction of an image and the direction of the gradient of the gradation values even when the gradient of an image and the movement of the image have an identical absolute value. The image correction shown in FIG. 15 is so determined that the amount of image correction increases as the absolute value of the moving amount of an image increases, and when the absolute value takes a predetermined value, the amount of image correction reaches the maximum. The maximum value depends on the combination of the directions of image movement and the gradient of gradation values. For example, the amount of image correction takes a maximum value when the combination of a positive (+) direction of image movement and a positive (+) direction of the gradient of gradation values; and when the combination of a negative (−) direction of image movement and a negative (−) direction of the gradient of gradation values.

According to the embodiment, to suppress the dynamic false contour, the device changes the amount of image correction according to the combination of the moving direction of an image and the direction of the gradient of the gradation values, which enables an excellent gradational display with a simple structure.

Third Exemplary Embodiment

Here will be described still another embodiment of the present invention with reference to FIGS. 16 through 18.

The gradational display device of the embodiment separately detects the horizontal component and the vertical component of a direction of movement of an image, and converts the gradient and movement of an image into a component in a direction of the gradient, thereby providing signal correction. In FIG. 16, like parts are identified by the same reference marks as in FIG. 1, and the description thereof will be omitted.

Figure 16:
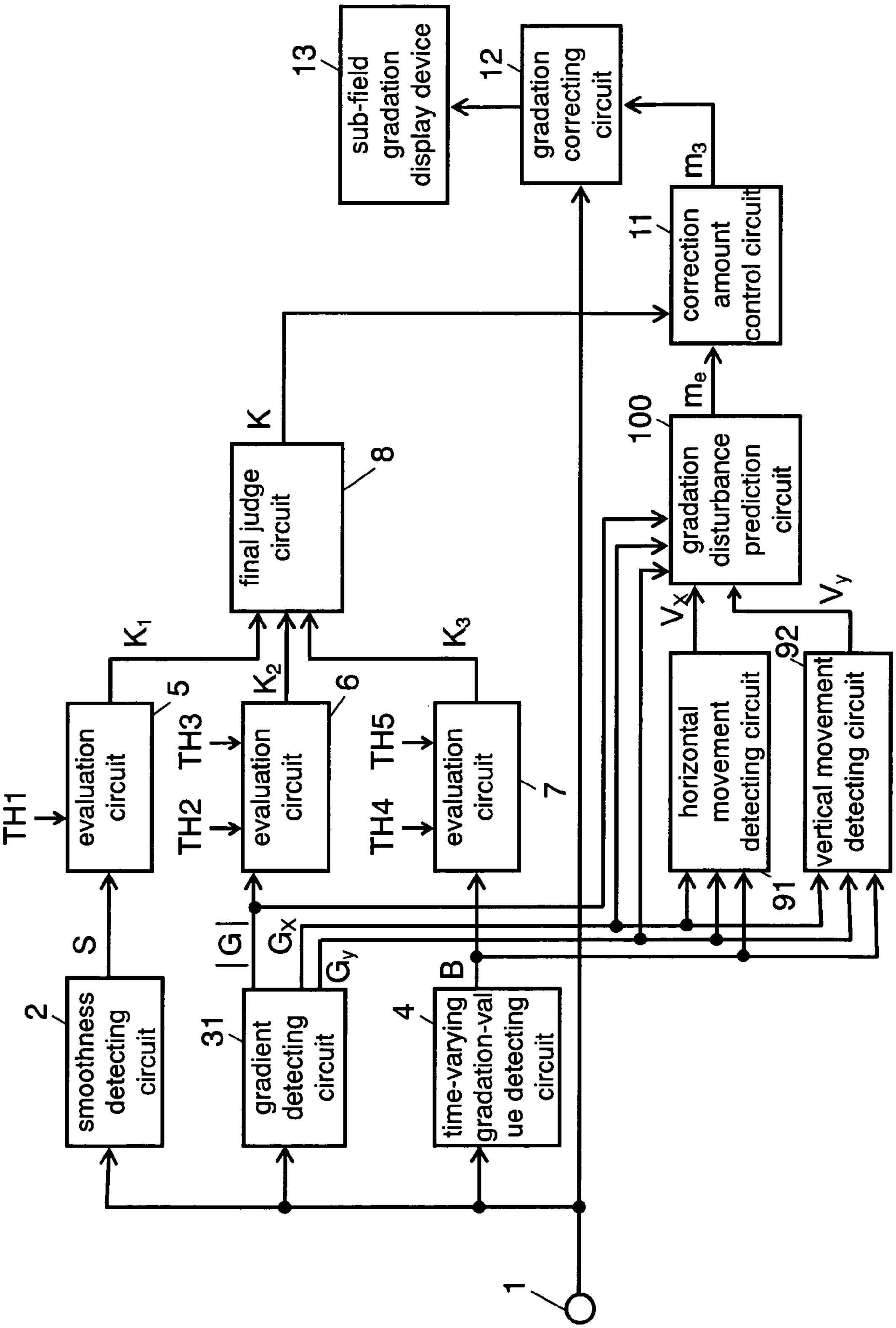
FIG. 16 is a block diagram illustrating the structure of a gradation display device of still another embodiment of the invention.

In FIG. 16, gradient detecting circuit 31 outputs the absolute value of gradient of gradation values represented by |G|, gradient horizontal component Gx and gradient vertical component Gy. Receiving output B (representing the change in gradation values with the passage of time), component Gx, and component Gy, horizontal movement detecting circuit 91 and vertical movement detecting circuit 92 calculate horizontal movement amount Vx and vertical movement amount Vy of an image, respectively. Gradation disturbance prediction circuit 100 calculates equivalent gradation disturbance $m_e$ according to gradient horizontal component Gx, gradient vertical component Gy, horizontal movement Vx, and vertical movement Vy.

Figure 17:
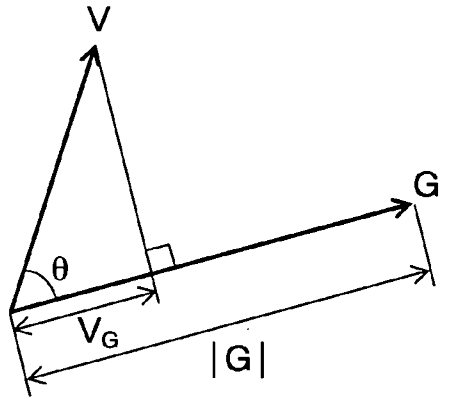
FIG. 17 shows component VG in the direction of a gradient of movement vector V of the device.

FIG. 17 shows the relation between movement vector V represented by image movement components (Vx, Vy), and gradient component VG of vector V Component VG is calculated by gradation disturbance prediction circuit 100 of FIG. 16.

Figure 18:
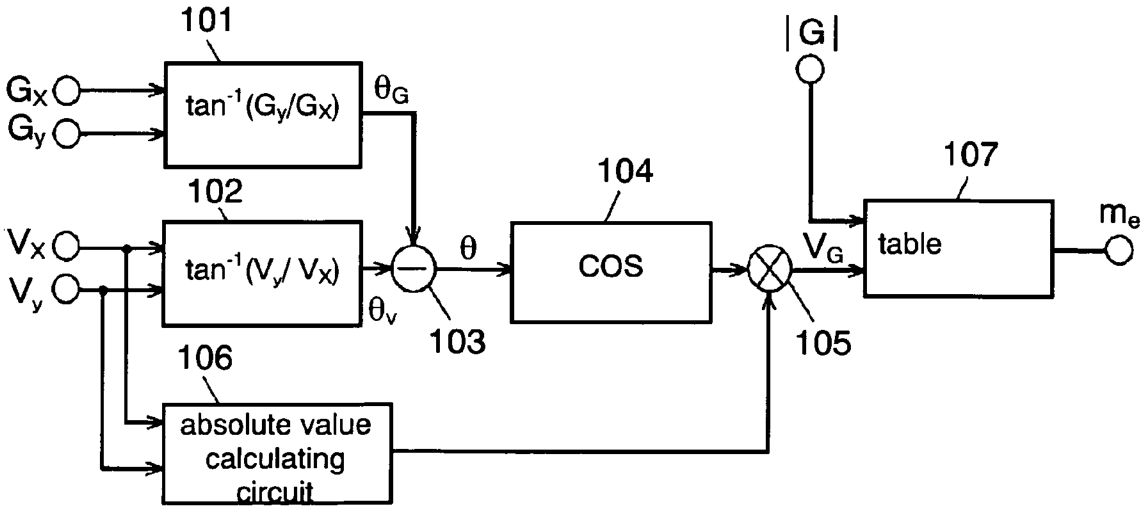
FIG. 18 illustrates the structure of a gradation disturbance prediction circuit of the device.

FIG. 18 explains an in-detail structure of gradation disturbance prediction circuit 100. Arc-tangent functions converters 101, 102, and subtracter 103 calculate angle θ, which is defined by movement vector V and gradient direction G. The calculated value of angle θ undergoes conversion in cosign function converter 104. The result is further multiplied by the absolute value of the moving amount of image obtained at absolute value calculating circuit 106. Movement component VG converted into gradient of image is thus obtained. Having the structure similar to gradation disturbance evaluating circuit 10 of FIG. 1, table 107 can predict the occurrence of the dynamic false contour.

With the structure above, the device can evaluate the movement of image as an amount converted into the gradient of image and properly predict the occurrence of the dynamic false contour. In this way, proper image correction, and accordingly, an excellent image display can be realized.

Fourth Exemplary Embodiment

Figure 19:
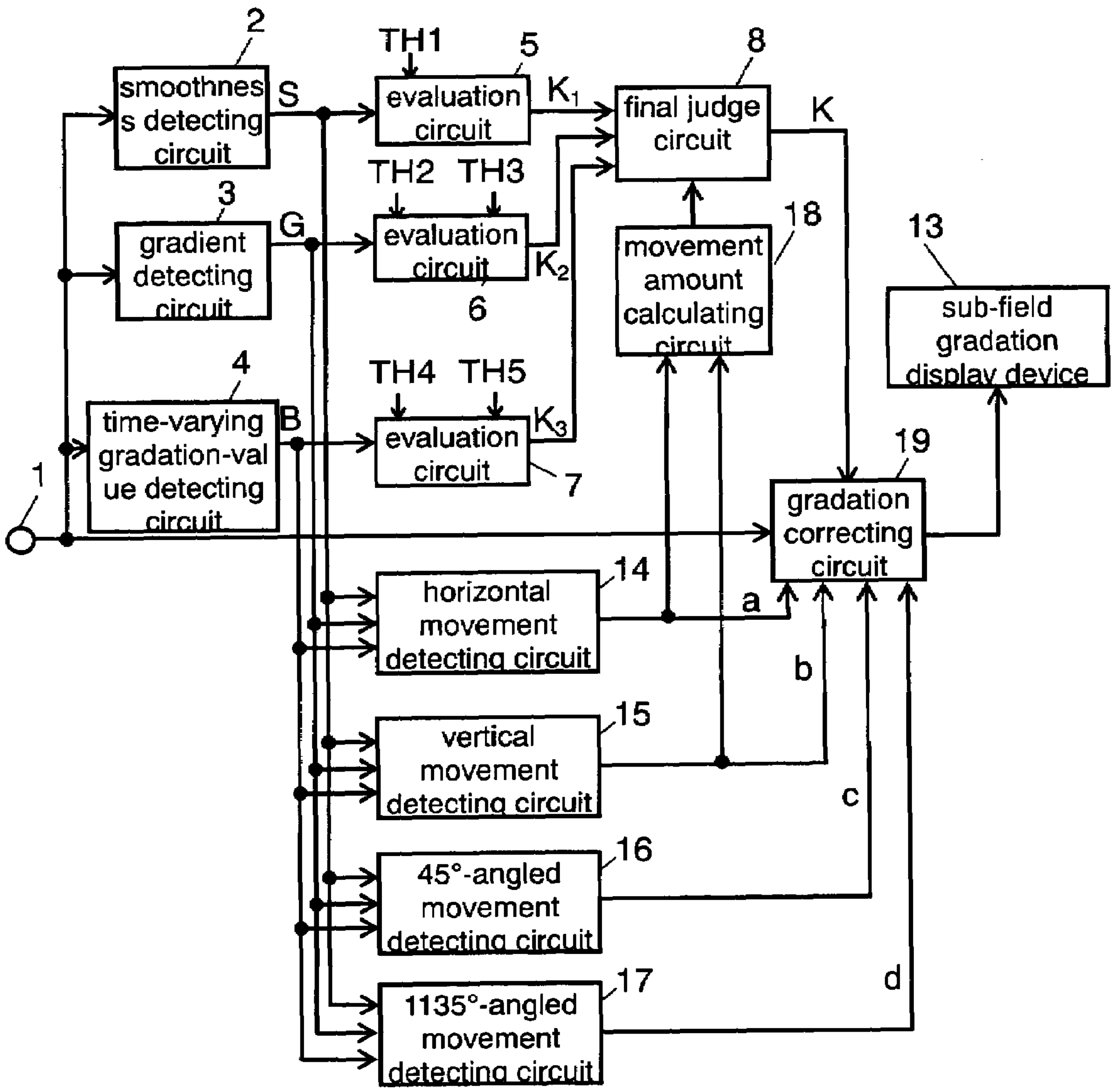
FIG. 19 is a block diagram illustrating the structure of a gradation display device of yet another embodiment of the invention.

FIG. 19 is a block diagram of still another structure of the gradational display device of the present invention. In FIG. 19, like parts are identified by the same reference marks as in FIG. 1. Output G from gradient detecting circuit 3 and output B from time-varying gradation-value detecting circuit 4 are fed into horizontal movement detecting circuit 14, vertical movement detecting circuit 15, 45°-angled movement detecting circuit 16, and 135°-angled movement detecting circuit 17. Each output from circuits 14 and 15 is fed into movement amount calculating circuit 18. Receiving the result from circuit 18, final judge circuit 8 outputs final judge result k, which is fed into gradation correcting circuit 19.

Gradation correcting circuit 19 receives image signals from input terminal 1. Circuit 19 is responsible for controlling gradational correction for correcting the gradation values of incoming image and error-variance. The methods of the gradational correction and the error-variance are controlled by the outputs from horizontal movement detecting circuit 14, vertical movement detecting circuit 15, 45°-angled movement detecting circuit 16, and 135°-angled movement detecting circuit 17, and final judge result k from final judge circuit 8. The gradationally corrected image signals are then fed into sub-field gradation display device 13 for image display on the screen.

The magnitude of movement of an image, which is detected in the four directions, is used for control in gradation correcting circuit 19. The calculation of the magnitude itself of movement of an image can be derived from the two: the amounts of horizontal movement and vertical movement. Receiving the two results, movement amount calculating circuit 18 calculates the magnitude of movement. The magnitude is then sent to final judge circuit 8, where final judge result k corresponding to a necessary amount of gradational correction is determined.

Here will be given in-detail description of gradation correcting circuit 19. Circuit 19 carries out gradational correction of incoming images according to a plurality of directions of movement amount of an image, a plurality of data on magnitude of the image, and final judge result k that corresponds to a necessary amount of gradational correction. Gradation correcting circuit 19 employs the encoding method similar to those shown in FIGS. 12 and 13.

Figure 20:
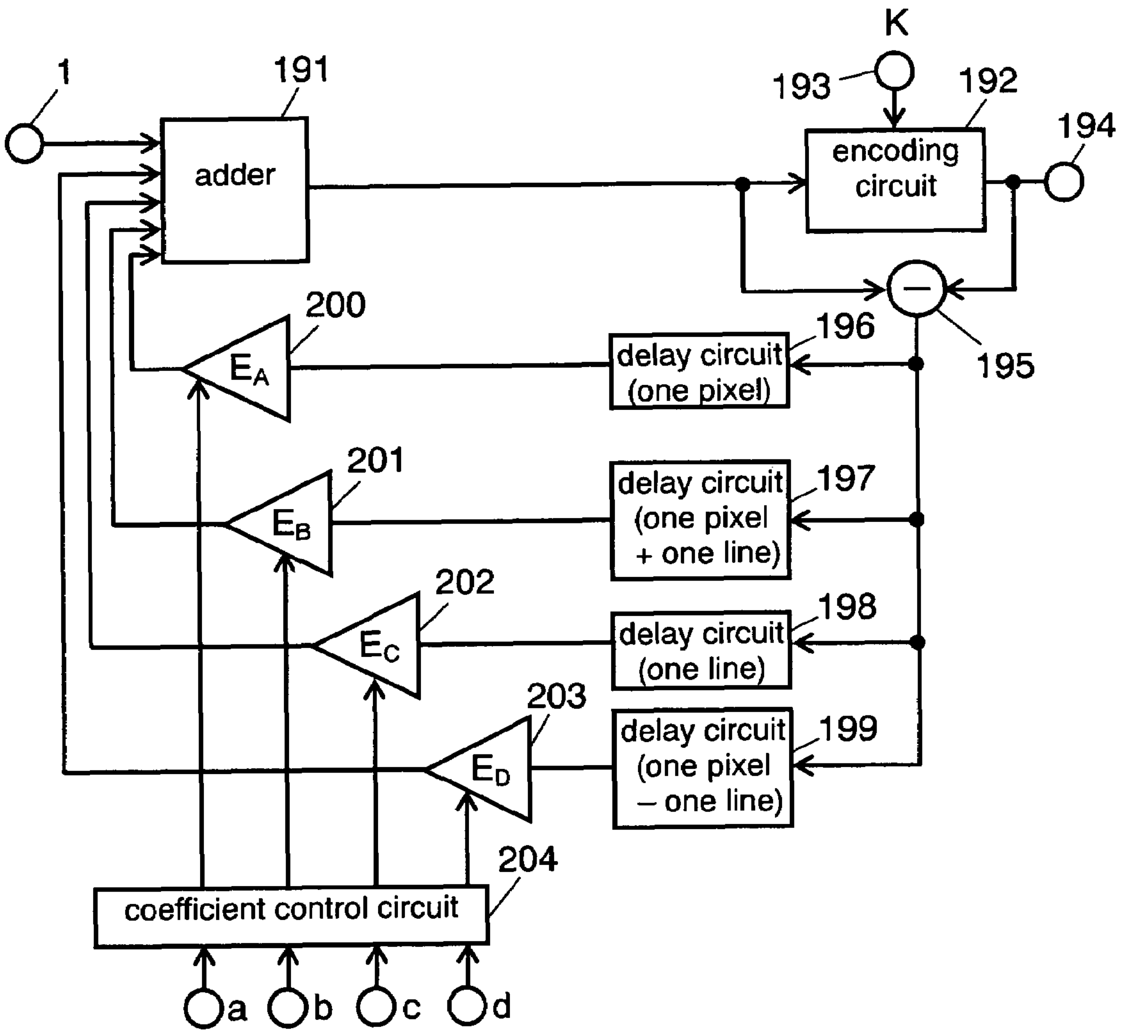
FIG. 20 is a block diagram illustrating the structure of the gradation correcting circuit of the device.

FIG. 20 shows a typical structure of gradation correcting circuit 19. Circuit 19 contains, as shown in FIG. 20, adder 191, encoding circuit 192, movement amount input terminal 193, output terminal 194, subtracter 195, delay circuits 196 through 199, coefficient circuits 200 through 203, and coefficient control circuit 204. The previously obtained data on movement of image, i.e., the amounts of horizontal movement, vertical movement, 45°-angled movement, and 135°-angled movement (i.e., a-d in FIG. 20) have been entered in coefficient control circuit 204. Receiving a, b, c, and d, coefficient circuits 200, 201, 202, and 203 calculate coefficients EA, EB, EC, and ED, respectively. Each coefficient is used for signal calculation in delay circuits 196 through 199, and then fed into adder 191. The process above forms an error-variance loop.

In the structure of FIG. 20, the signal fed into movement amount input terminal 193 is responsible for the gradation control on the gradation values of incoming image signal. The encoding method shown in FIG. 13 is carried out in encoding circuit 192 of gradation correcting circuit 19.

The incoming image signal is fed, with the number of the gradation levels determined suitable for the movement amount of the image, to the display device, whereby the dynamic false contour is effectively suppressed. At the same time, by virtue of the error-variance loop in the structure, equivalent gradation values are maintained. The dynamic false contour can be suppressed by keeping the gradation levels to a limited number; an excessive limitation, however, can invite an inconveniency—the error-variance process increases noises, and degradation in image quality may result.

FIG. 21 shows a typical coefficient distribution for error-variance. When pixel P undergoes gradational control, the difference between the input signal and the display signal is distributed to the adjacent four pixels: A, B, C, and D. Distribution coefficients EA, EB, EC, and ED take, for example, the values shown in FIG. 22. A small movement of an image will not substantially cause the dynamic false contour—the device determines the image as still image. In this case, distribution coefficients EA, EB, EC, and ED take, as shown in FIG. 22, 7, 1, 5, and 3, respectively. The values given to the coefficients should sum up to 1 since the coefficients of error-variance are supposed to have a distributed portion of error; for purposes of inconvenience, the 16-fold value is employed in FIG. 22.

When an image shown on the screen moves in a specific direction, each coefficient of EA, EB, EC, and ED takes a different value according to the moving direction shown in FIG. 22. The values in the table are defined to each coefficient when the image noticeably moves in each direction; in the actual operation, the coefficients take values with a continuous, or a step-by-step change according to the movement of the image.

FIG. 23 illustrates the coefficient distribution, taking coefficient EA as an example. When the image is a still picture, coefficient EA takes 7. When detecting the movement of the image, for example, in the horizontal direction, the device gives 10 to coefficient EA according to the movement. When the image moves in the vertical direction, coefficient EA is determined so as to gradually change from 7 to 0. Similarly, when the image moves in diagonal directions, coefficient EA gradually changes from 7 to 3.

Figure 24:
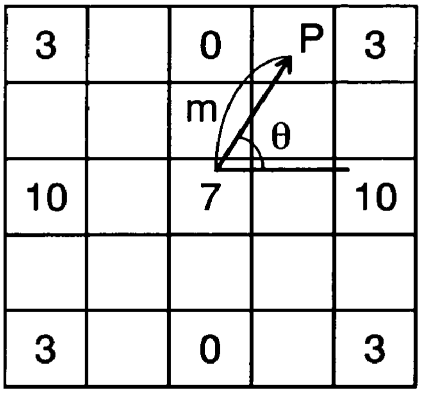
FIG. 24 shows how to calculate error-variance coefficient EA of the device.
Figure 25:
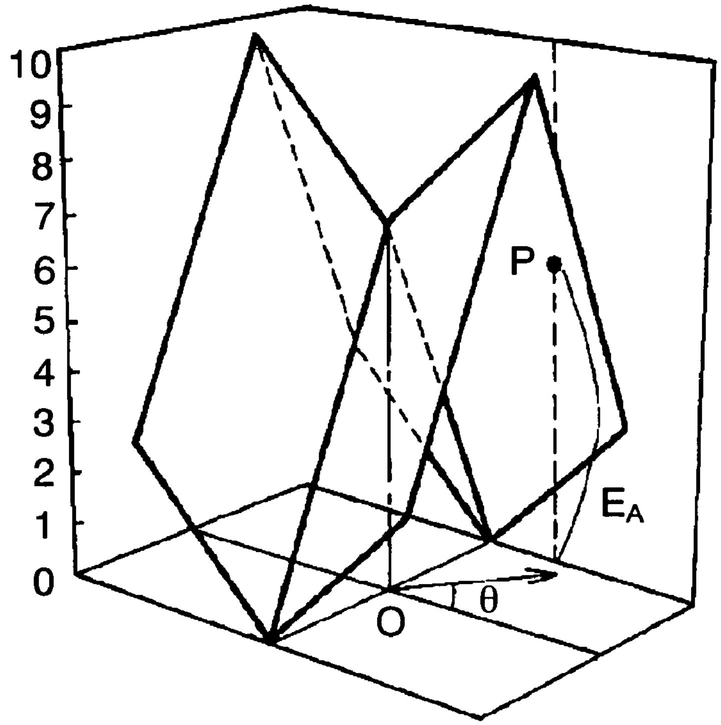
FIG. 25 illustrates the interpolation image of error-variance coefficient EA of the device.

FIG. 24 also illustrates the distribution, showing the relation between angle θ shown in FIG. 22 and movement of image. Supposing that an image moves in a direction having angle θ from the horizontal direction, FIG. 24 shows the movement of image as a vector (where, the magnitude of the movement of the image is represented by m). FIG. 25 shows the transition of coefficient EA, where values which coefficient EA can take in the transition are interpolated from the values shown in FIG. 23. In the graph, the horizontal direction on the screen is represented by θ=0. The vertical axis of the graph represents values given to coefficient EA. Point P in FIG. 25 corresponds to point P in FIG. 24, and the coefficient value is represented by EA.

The coefficient values of error-variance continuously vary, as described above, according to the moving amount, in direction and magnitude, of image with respect to the value defined in the still image. Therefore, the device can offer a smooth gradational correction according to the moving amount of image in direction and magnitude, thereby decreasing the occurrence of the dynamic false contour and carrying out a proper error-variance.

Figure 26:
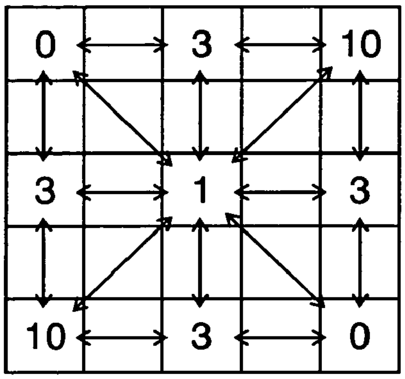
FIG. 26 shows transition of error-variance coefficient EB of the device
Figure 27:
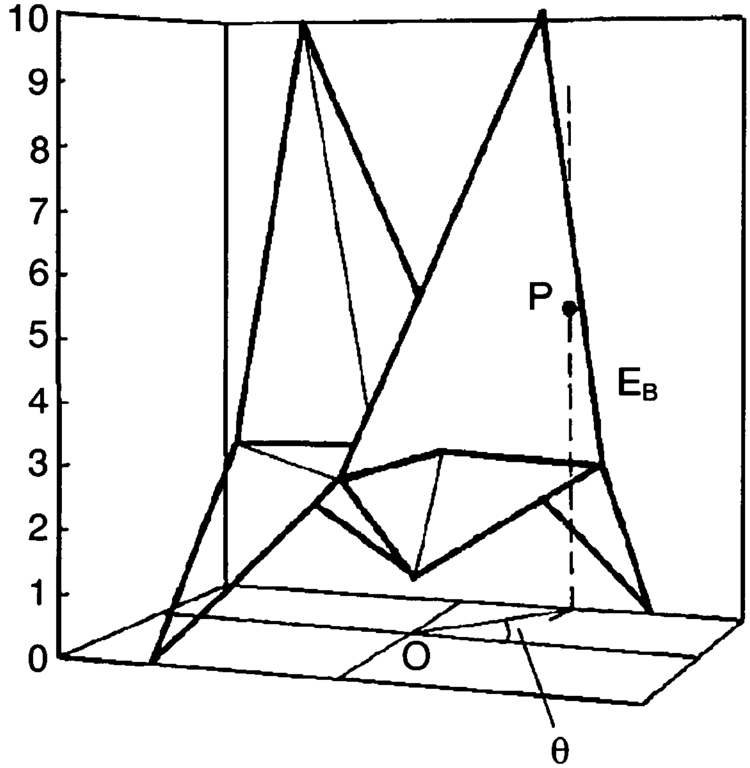
FIG. 27 illustrates the interpolation image of error-variance coefficient EB of the device.
Figure 28:
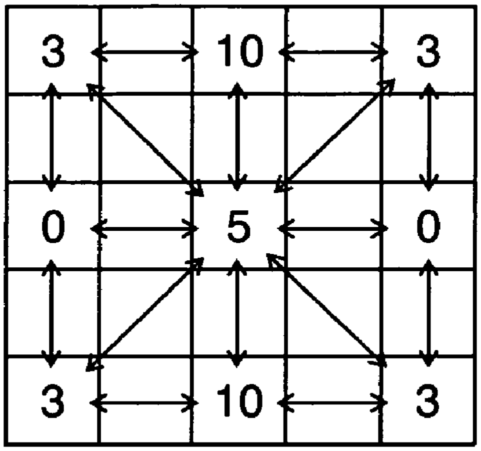
FIG. 28 illustrates the interpolation image of error-istribution coefficient EC of the device.
Figure 29:
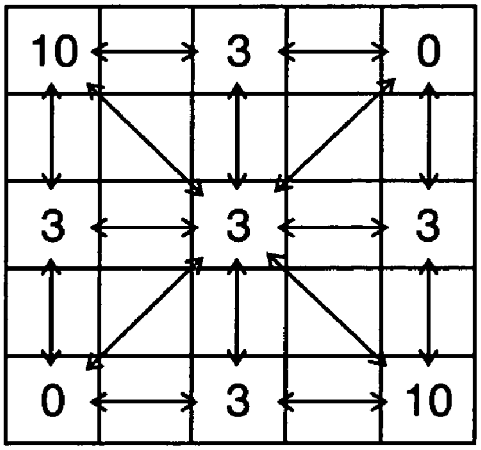
FIG. 29 illustrates the interpolation image of error-variance coefficient ED of the device.

As for other coefficients, for example, coefficient EB takes values shown in FIG. 26. Interpolating the values of FIG. 26, FIG. 27 shows the transition of coefficient EB. FIGS. 28 and 29 show the values taken by coefficients EC, ED, respectively. Each of coefficients EC and ED takes a transition (not shown) different from those of EA (FIG. 25) and EB (FIG. 27).

The present invention, as described so far, provides a gradation display device employing the sub-fields capable of performing signal processing including the control of gradational correction and error-variance. With the device, excellent gradation display is obtained, with the occurrence of the dynamic false contour decreased.

In the description above, considering an optical phenomenon of human eyes, the coefficients of error-variance for the pixels located parallel to the moving direction of image are determined to have a relatively large value. Researchers say that when the viewer's eyes follow a moving object on the screen, the amounts of emission by the pixels along the moving direction are perceived as a "visually amalgamated" amount on the retinas of the eyes. That is, it seems that the pixels aligned in the direction parallel to the moving direction of image work equivalent to one pixel. Sharing a larger amount of error with the pixels in the direction parallel to the movement reduces the amount of error-variance assigned to the pixels insusceptible to the "visual amalgamation", i.e., the pixels aligned in a direction orthogonal to the movement of the image. This can suppress an increase in noise in the error-variance.

Although the description of the embodiment introduces a liner interpolation of coefficient values, it is not necessarily limited thereto; a curvilinear interpolation using higher dimensional functions, or other continuous functions can be employed. Although the description takes an example of the gradation control in which the gradation values falls into several steps; it is not limited to the number of the gradation steps. As a peculiar example, the gradational correction may not control the number of the gradation values but the coefficients of error-variance. The coefficients of error-variance described in the embodiment are not limited to those shown in the drawings; it will be understood that the same effect can be obtained by using other coefficients, as long as the coefficients are determined in consideration of the visually amalgamated effect in the moving direction of image.

As described above, the device of the present invention contains a gradient detector for detecting a gradient of gradation values of pixels in an image fed into the device; a time-varying gradation-value detector for detecting changes in gradation values of pixels with the passage of time; an image detector for detecting the magnitude and direction of movement of an image to be entered according to the outputs from the gradient detector and the time-varying gradation-value detector; and a signal corrector for correcting signals of incoming image according to the detected magnitude and direction of an image and a weight assigned to each sub-field so as to display proper image on the screen. The device structured above detects the moving direction of image and locates the area where the dynamic false contour is likely to occur. Therefore, the device can provide effective gradational correction, accordingly, excellent image display with proper gradation characteristics maintained, as well as effectively suppressing the dynamic false contour.

According to the present invention, the movement and gradient of the image area being susceptible to the dynamic false contour can be detected by a simple structure, whereby image display with high quality is obtained, with the dynamic false contour properly suppressed. In this way, the quality of image display of a gradational display device employing the sub-fields can be improved.

INDUSTRIAL APPLICABILITY

According to the present invention, the movement and gradient of the image area being susceptible to the dynamic false contour can be detected by a simple structure, whereby image display with high quality is obtained, with the dynamic false contour properly suppressed. In this way, the quality of image display of a gradational display device employing the sub-fields can be improved.

The invention claimed is:

1. A gradation display device in which a TV field is divided into a plurality of sub-fields each of which has a predetermined weight of luminance, the device comprising:

a gradient detector for detecting a gradient of gradation values of pixels in an incoming image;

a time-varying gradation-value detector for detecting changes in the gradation values in the pixels with a passage of time;

an image detector for detecting a magnitude and a direction of movement of the incoming image according to outputs from the gradient detector and the time-varying gradation-value detector; and a signal corrector for correcting signals of the incoming image according to the detected magnitude and direction of the image and the weight of luminance assigned to each of the sub-fields so as to display proper image.

2. A gradation display device in which a TV field is divided into a plurality of sub-fields each of which has a predetermined weight of luminance, the device comprising:

a smoothness detector for detecting smoothness of gradation values of pixels in an incoming image;

a gradient detector for detecting a gradient of the gradation values of the pixels in the incoming image;

a time-varying gradation-value detector for detecting changes in the gradation values in the pixels with a passage of time;

an image detector for detecting a magnitude and a direction of movement of the incoming image according to outputs from the gradient detector and the time-varying gradation-value detector; and a signal corrector for correcting signals of the incoming image according to the detected magnitude and direction of the image and the weight of luminance assigned to each of the sub-fields so as to display proper image.

3. The gradation display device of claim 1, wherein the device separately detects a horizontal component and a vertical component of a direction of movement of an incoming image, and converts gradient and movement of the image into a component in an direction of the gradient to provide proper signal correction.

4. The gradation display device of claim 1, wherein the signal corrector not only controls correction of the gradation values of the incoming image but also controls error-variance.

5. The gradation display device of claim 4, wherein the signal corrector controls the gradation values of the incoming image according to the magnitude of movement of the image and controls signal processing for the error-variance according to a direction of the movement of the image.

6. The gradation display device of claim 2, wherein the device separately detects a horizontal component and a vertical component of a direction of movement of an incoming image, and converts gradient and movement of the image into a component in an direction of the gradient to provide proper signal correction.

7. The gradation display device of claim 2, wherein the signal corrector not only controls correction of the gradation values of the incoming image but also controls error-variance.

* * * * *